United States Patent
Ritter et al.

(10) Patent No.: US 7,751,811 B2
(45) Date of Patent: Jul. 6, 2010

(54) DATA ACQUISITION SYSTEM AND MOBILE TERMINAL

(75) Inventors: Rudolf Ritter, Zollikofen (SE); Alexander Rüegg, Dättwil (SE); Beat Becker, Untersiggenthal (SE)

(73) Assignee: Kudelski SA, Cheseaux-sur-Lausanne (CH)

( * ) Notice: Subject to any disclaimer, the term of this patent is extended or adjusted under 35 U.S.C. 154(b) by 336 days.

(21) Appl. No.: 10/862,339

(22) Filed: Jun. 8, 2004

(65) Prior Publication Data

US 2005/0272437 A1    Dec. 8, 2005

(51) Int. Cl.
*H04W 24/00*    (2009.01)
(52) U.S. Cl. .............. 455/423; 455/3.01; 455/3.02; 455/41.2
(58) Field of Classification Search .............. 455/452.2, 455/412.1, 41.2, 500–506, 517, 67.13, 67.11, 455/412.2, 423, 433, 3.01, 426, 3.02, 2.01
See application file for complete search history.

(56) References Cited

U.S. PATENT DOCUMENTS

| | | | | |
|---|---|---|---|---|
| 6,088,588 | A * | 7/2000 | Osborne | 455/425 |
| 6,445,917 | B1 * | 9/2002 | Bark et al. | 455/423 |
| 2002/0028668 | A1 * | 3/2002 | Grayson et al. | 455/403 |
| 2002/0155816 | A1 * | 10/2002 | Fodor et al. | 455/67.1 |
| 2003/0162512 | A1 * | 8/2003 | Lauterbach et al. | 455/120 |
| 2004/0058651 | A1 * | 3/2004 | Ross et al. | 455/67.11 |
| 2004/0198234 | A1 * | 10/2004 | Wacker et al. | 455/67.13 |
| 2004/0203436 | A1 * | 10/2004 | Oesterling | 455/67.11 |

FOREIGN PATENT DOCUMENTS

| | | |
|---|---|---|
| DE | 19918829 A1 | 10/2000 |
| EP | 1 318 624 A1 | 6/2003 |
| WO | WO 00/65755 | 11/2000 |
| WO | WO 01/43364 A1 | 6/2001 |

OTHER PUBLICATIONS

Search report, Oct. 14, 2002.

* cited by examiner

*Primary Examiner*—Vincent P Harper
*Assistant Examiner*—Dung Lam
(74) *Attorney, Agent, or Firm*—Harness, Dickey & Pierce, P.L.C.

(57) ABSTRACT

A data acquisition system that comprises several mobile terminals, each comprising a broadcast receiver for receiving the broadcast signals that are unidirectionally transmitted from a broadcasting station via an air interface, and a mobile radio module for the communication via a mobile network. Furthermore, the mobile terminals each include means for providing data accountings; their contents depending on the broadcast signals received and, for example, on data relating to the signal quality of the received broadcast signals. The data acquisition system comprises a memory connected to the mobile network. The data accountings provided are transmitted from the mobile terminals by means of the mobile radio modules via the mobile network where they are stored in the memory.

24 Claims, 2 Drawing Sheets

DATA ACQUISITION SYSTEM AND MOBILE TERMINAL

TECHNICAL FIELD

Example embodiments relate to a data acquisition system and a mobile terminal.

BACKGROUND

Broadcast systems with transmitters that transmit unidirectional broadcast signals via an air interlace, for example a radio or television transmitter, do not dispose of a return channel. For the purpose of obtaining data about program quality and/or reception quality of the broadcast systems, separate communication channels must be used. For the determination of the reception quality, or rather the signal quality of the broadcast signals, special mobile measuring stations are usually used by the operator of a broadcast station that serve to measure the received radio signals at different locations in the transmission area of the broadcast station and will register the measured values for later evaluation on a data carrier record. For the determination of commercial program quality, or rather of the programs selected by users and of the relative audience numbers, usually the opinions of consumers (television viewers or radio listeners) are recorded in writing, by telephone or via special data acquisition devices. The data acquisition devices store input data on a data carrier or transmit said data via the public switched telephone network to an analyzing center.

In the published patent application WO01/43364 an interactive media system is described, in which radio listeners or television viewers (users) can transmit user instructions via mobile terminals to a central office. The mobile terminals in accordance with WO01/43364 include a broadcast receiver, a GPS-receiver (Global Positioning System) and a wireless transmitter. The user instructions will be transmitted to the central office in accordance with WO01/43364 together with the current geographical position, the momentary adjusted frequency of the radio-receiver, the current time data and user identification, after pressing a determined control button of the mobile terminal by the user. In accordance with WO01/43364 the respective broadcasting program that is listened to or seen by the user will be identified thanks to the received information. In accordance with WO01/43364, the central office obtains information from a database concerning the identified broadcasting program and files this information on the Internet for later access by the user. Although the mobile terminal in the system in accordance with the WO01/43364 disposes of a return channel thanks to the wireless transmitter, the system is not suitable for the statistical data record relating to program quality and/or reception quality of the broadcast systems, since the user instructions are only transmitted to the central office when sent by the user and since no statements can be made about the reception quality, or rather about the signal quality of the broadcast signals.

SUMMARY

Example embodiments are to propose a data acquisition system and a mobile terminal for data recording the determination of program quality and/or reception quality of broadcasting systems.

Example embodiments are obtained in particular through the invention using several mobile terminals in the data acquisition system, which in each case have a broadcast receiver for receiving broadcast signals that are transmitted unidirectionally through a broadcasting station via an air interface and that comprise a mobile radio module for communication through a mobile network. The mobile terminals in each case including means for providing data accounting, their contents depending on the received broadcast signals. The system includes a data memory connected to the mobile network and said means are constituted in such a way that the provided data accountings are supplied to the mobile radio module for transmission to the data memory. The advantage of this data acquisition system consists particularly in the capturing of data depending on received broadcast signals at several geographical locations via several mobile terminals operated by different users, and said data can be stored in a centralized data memory. In this way, the result is data acquisition distributed both geographically as well as statistically with regard to user types. This produces the situation again where the broadcast signals of several different present broadcast transmitters are detected.

Each mobile terminal preferably includes a quality determination module for the purpose of determining the signal quality of the broadcast signals received from the broadcasting station and said means are constituted in such a way that data is preferably introduced into the data accountings relating to the determined broadcast signal quality as data elements. The quality determination module preferably includes a field-strength measuring module for measuring the field strength of broadcast signals received from the broadcasting station. In this way the broadcast signal quality, particularly the broadcast field strength-value, of received broadcast signals which can be transmitted through several different broadcast transmitters, can be determined by several mobile terminals at several different geographical locations and can be stored in the central data memory.

Preferably, the mobile terminals each include a position determination module for the purpose of determining the current geographical position of the mobile terminal, and said means are preferably constituted in such a way that the determined current geographical position is introduced into the data accountings as a data element. By linking the current geographical location with the other data determined for this relative location, respectively data elements, the data stored in the data memory can be evaluated geographically in terms of its local distribution. The determination of the current geographical location of the mobile terminal by means of a position determination module in the mobile terminals has the advantage that the proposed data acquisition system does not need the location information of the mobile terminals, which is determined and stored by the infrastructure of the mobile network that is often not very precise and that in certain countries is subordinated to privacy protection.

In a preferred variant, the mobile terminals each include a decoder connected to the broadcast receiver for the purpose of obtaining broadcast data contained in the broadcast signals received from the broadcasting station, said means are made in such a way that certain broadcast data obtained is introduced into the data accountings as data elements, in particular, broadcast station identification contained in this data. Broadcast data that is transmitted from the broadcasting station include on the one hand program accompanying data with reference to the respective programs (Program Associated Data, PAD) or without reference to the programs (Non Program Associated Data, NPAD), for example in RDS- (Radio Data System), DAB- (Digital Audio Broadcasting), DVB- (Digital Video Broadcasting) or DRM-Broadcasting Systems (Digital Radio Mondiale) and on the other hand Digital Audio (Radio programs) or Video-programs (television programs) in Digital Broadcasting Systems as DAB, DRM-Broadcasting Systems or DVB. The collection of the statement of contents included in the broadcast data, that identify the transmitted program, allows the statistical evaluation of the data stored in the central memory such as audience numbers and switch-on times of the respective considered radio and television programs. Due to the broadcast transmitter identification, that for example can also contain an identification of the program provider, on the one hand the statistical evaluations can be carried out in a specifically transmitter way and/or in a specifically provider way and on the other hand their results can be transmitted to the respective transmitters and providers.

In a variant of the embodiment, the mobile terminals each include an error determination module connected to the decoder for the purpose of determining the bit error rate of the broadcast signal received from the broadcasting station and said elements are constituted in such a way that the determined broadcast bit error rate is introduced into the data accountings as a data element. In this way, a further quality criterion for digital broadcast systems can be detected for the evaluation of the signal quality of the broadcast signals received.

In a variant of the embodiment, the mobile terminals each include a quality determination module for the determination of the signal quality of the mobile radio signals received from the base stations of the mobile network and said means are constituted in such a way that the data relating to the determined mobile radio communication signal quality is introduced into data accounting as data elements. The quality determination module preferably includes a field-strength measuring module for measuring the mobile radio signals received from the base stations of the mobile network and/or an error determination module for the determination of the bit error rate of the received mobile radio signals. In this way the mobile radio communication signal quality, particularly the mobile radio field strength value and/or the mobile radio bit error rate can be determined by mobile radio communication signals received via several mobile terminals at several different geographical locations and can be collected in the central memory. Through the (combined) determination of the signal quality, the received broadcast signals of the received mobile radio communication signals, the reception quality of the radio signals of the broadcasting station and the reception quality of radio signals of the mobile network can be statistically evaluated and compared in several geographical locations. This possibility for comparison is particularly advantageous for the tuning of mobile radio networks and broadcasting stations in those areas where their transmission areas, comprising a broadcast receiver as well as a mobile radio module, must overlap for the use of combined terminals. With tuning, such areas may be reached where both the signal quality of received broadcast signals as well as the signal quality of received mobile radio communication signals are sufficiently high to allow combined applications, in which both the services of the broadcasting station as well as the services of the mobile network are used and accordingly the broadcast receiver and the mobile radio module are used in combination.

In a variant each mobile terminal includes an identification module with an identification data element stored in it, said means being constituted in such a way that the identification data element is introduced into the data accountings. In this way the respective mobile terminal and/or the respective user, from which the data accountings are transmitted, can be identified in the central memory and, for example, rewards can be credited or transmitted, for example an assigned value for free acquisition of services liable for costs. Moreover, user identification allows a demographical evaluation of the data stored in the memory to be carried out, particularly the identification and statement of contents of radio television programs, that is to say it can be evaluated in terms of the age group, sex or social status of the listeners or spectators.

Said means are preferably constituted in such a way that those data elements assigned to each other are introduced into said data accountings, the values of said elements being determined at the same moment. In this way, the data relating to the determined broadcast signal quality, the data relating to the determined mobile radio communication signal quality, the current geographical location and/or the obtained broadcast data, which will be determined at the same time, can be assigned to each other in the memory. By determining and assigning, for example, a time and date, the time of day and the date can be assigned to the data records of these data elements that can be introduced into a common data account and can be transmitted at the same time from the mobile terminal for the storage in the memory.

BRIEF DESCRIPTION OF THE DRAWINGS

In the following, an embodiment of the present invention is described on the basis of examples. The example of the embodiment illustrates the only enclosed Figure.

DETAILED DESCRIPTION OF EXAMPLE EMBODIMENTS

Figure 1:
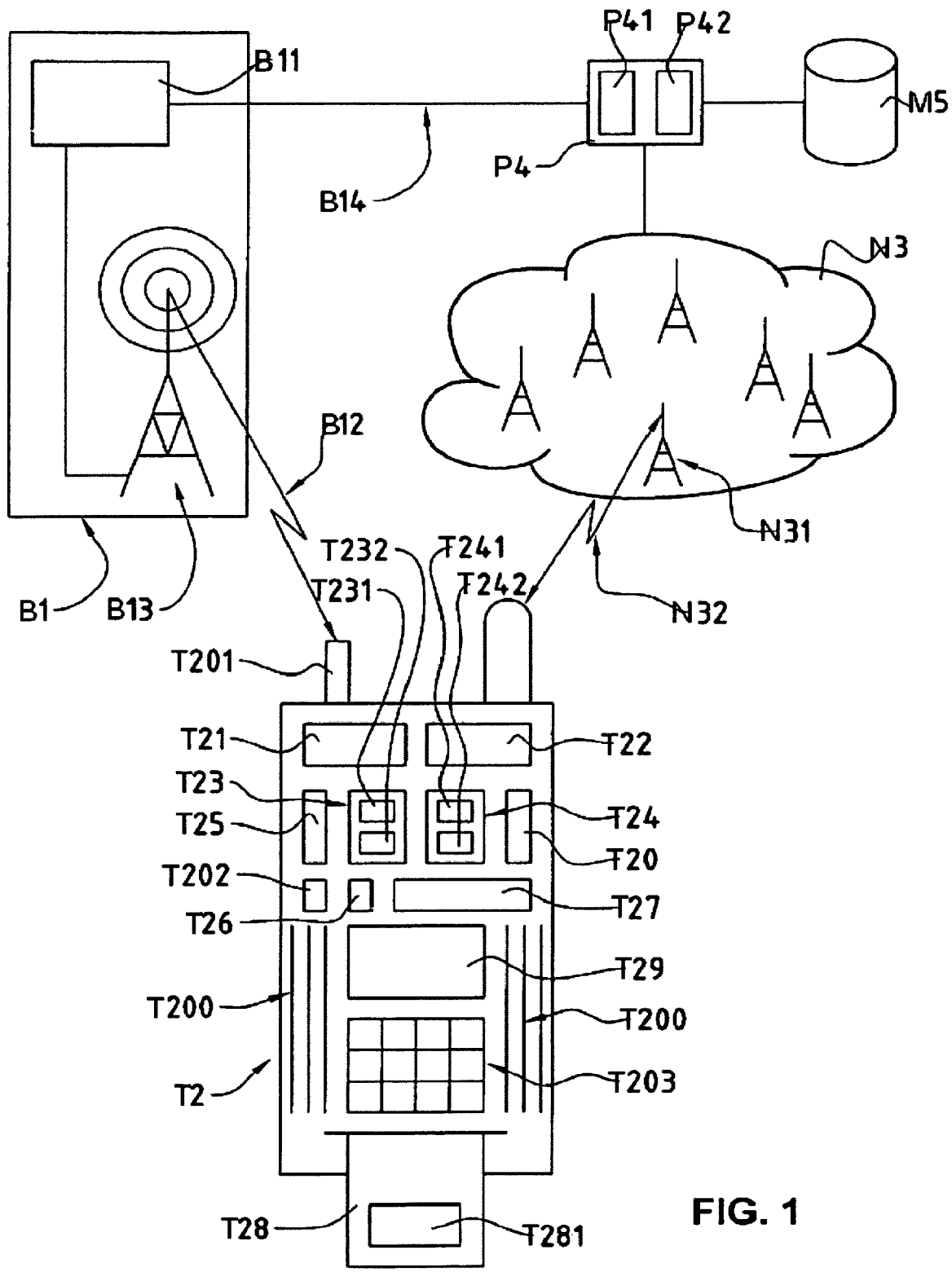
FIG. 1 shows a block diagram that schematically illustrates a mobile terminal that receives broadcast signals by means of a radio-receiver from a broadcasting station and transmits via a mobile radio module the data accountings via a mobile network for storage in a memory.
Figure 2:
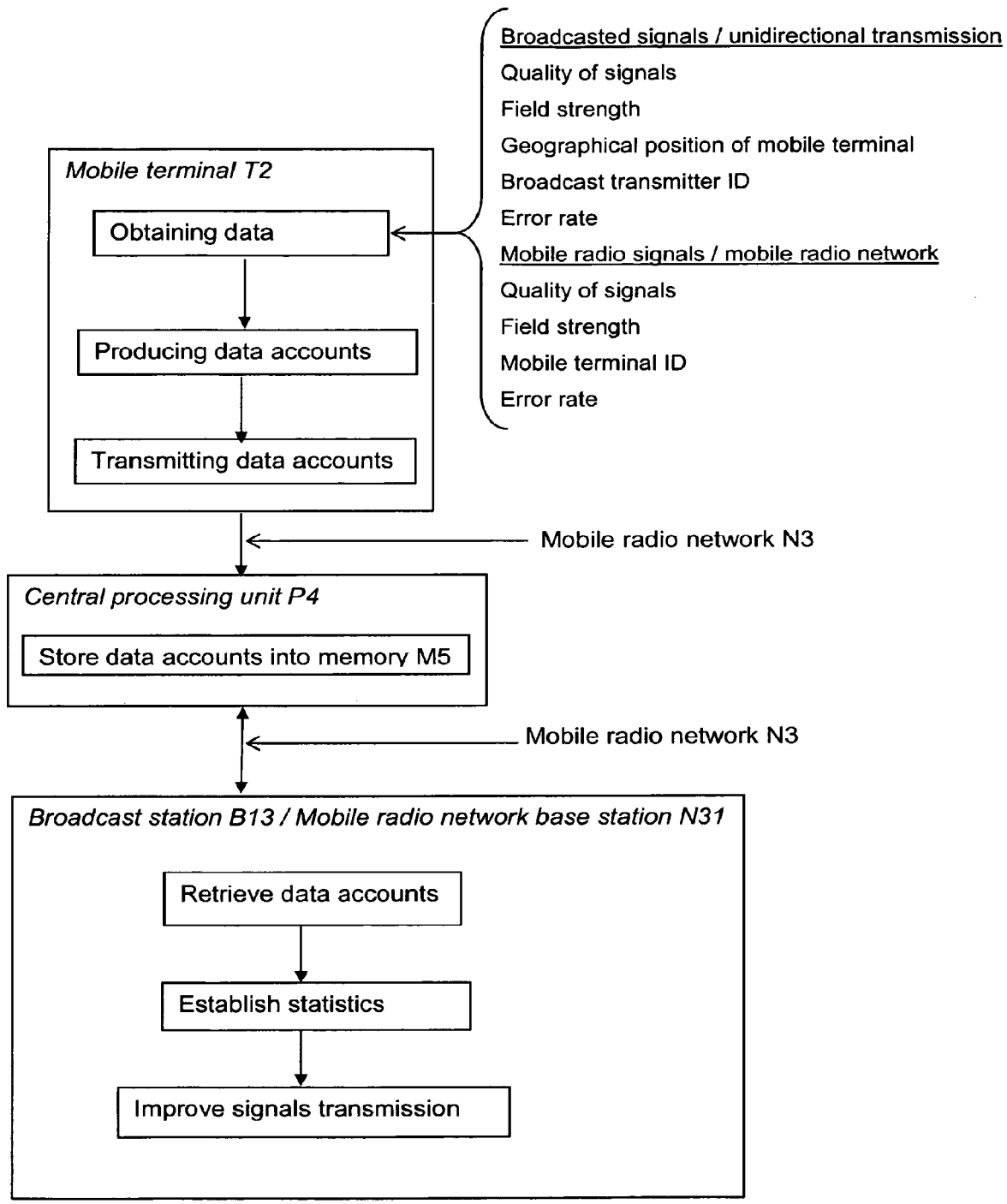
FIG. 2 shows a functional flowchart of the system according to the invention

In FIG. 1 reference B1 relates to a radio system, comprising a broadcasting station B13 for the unidirectional transmission of broadcast signals via an air interface B12, for example a RDS-, DAB-, DVB- or DRM-Broadcasting System or another broadcasting system, e.g. a satellite-based broadcasting system. The broadcast signals correspond to radio and/or television programs, comprising for example (digital) broadcast data like audio-programs, video-programs or program accompanying data with or without reference relative to the respective programs (PAD, respectively NPAD).

The broadcasting station B13 is connected to a data processing device B11, comprising at least a computer which is used for providing the transmission contents, that is to say the television and/or radio programs to be transmitted, particularly the broadcast data and the program-accompanying data contained in it. The program-accompanying data will preferably be transmitted in accordance with the defined specifications like ADM- (Ancillary Data Manager), MOT- (Multimedia Object Transfer) or similar specifications. The program-accompanying data includes, for example, broadcast transmitter identification, data relating to the time of day and the date, the difference in positions for DGPS-applications (Differential Global Positioning System), a program identification and/or statement of contents like a title and name of a composer of a music piece, the program source, for example the provider of the respective program, indications relating to the playing time and/or the starting and final time of a program segment, other information, for example, information about traffic or software programs, which can be implemented in a processor.

As schematically illustrated in FIG. 1, the transmitted broadcast signals are received from the broadcast receiver T21 of the mobile terminal T2 via a receiving antenna T201 through the air interface B12. After the corresponding processing, the received broadcast signals can be represented to the user of the mobile terminal T2 as radio programs, television programs and/or data on the display T29, respectively they can be reproduced through the electro-acoustic converter T200.

Moreover, the mobile terminal T2 includes a decoder T25 connected to the broadcast receiver T21, which obtains the broadcast data from the broadcast signals received from the broadcasting station B13. The decoder T25 is connected to the broadcast receiver T21, the decoder T25 and the broadcast receiver T21 for example being produced as integrated circuits on separate chips or on one or several common chips.

The mobile terminal T2 includes, moreover, a quality determination module T23 connected to the broadcast receiver T21 that determines the signal quality of the broadcast signals received from the broadcasting station B13. For this purpose the quality determination module T23 includes a field strength measuring module T231 that measures the field strength of the Broadcast signals received from the broadcasting station B13. The field strength measuring module T231 is connected to the broadcast receiver T21 and is preferably produced as an integrated circuit, for example together with the broadcast receiver T21 on a common chip or on a separate chip. The quality determination module T23 can also include an error determination module T232 connected to the decoder T25 that determines the bit error rate of the broadcast signal received from the broadcasting station B13. The error determination module T232 is produced as an integrated circuit or as a programmed software module and is positioned on a common chip, for example, with the decoder T25.

As schematically illustrated in FIG. 1, the mobile terminal T2 includes position determination means T20, for example a GPS-receiver (Global Positioning System) or a programmed software module, which controls a processor of the mobile terminal T2 in such a way that it obtains the current geographical position of the mobile terminal T2 from the infrastructure of the mobile network N3. For a more precise position determination by means of DGPS the position determination means T20 can also use the position difference contained in the received broadcast data.

Furthermore, the mobile terminal T2 includes time determination means T26 which determine the time and, for example, also the date. The time determination means T26 are designed as an integrated circuit or as a programmed software module that controls a processor of the mobile terminal T2. The programmed software module of the time determination means T26 takes, for example, the time and the date from the received broadcast data or from the data that had been received via the mobile network N3, or it calculates these values controlling a synchronizer from the stored basic values.

As schematically illustrated in FIG. 1 the mobile terminal T2 additionally includes a mobile radio module T22, particularly a mobile radio module T22 for the bi-directional communication suggested through the double arrow N32 via the mobile network N3, for example a GSM- (Global System for Mobile Communication) or UMTS-network (Universal Mobile Telephone System), or another network, for example a satellite-based mobile network. The mobile radio module T22 is implemented as an integrated circuit, together with the broadcast receiver T21 on a common chip or on one or several separate chips.

Furthermore, the mobile terminal T2 includes a quality determination module T24 connected to the mobile radio module T22 that determines the signal quality of the mobile radio signals received from the base station N31 of the mobile network N3. For this purpose the quality determination module T24 includes a field-strength measuring module T241 that measures the field strength of the mobile radio signals received from the base station N31 of the mobile network N3. The field-strength measuring module T241 is connected to the mobile radio module T22 and is preferably produced as an integrated circuit, for example together with the mobile radio module T22 on a common chip or on a separate chip. The quality determination module T24 can also include an error determination module T242 connected to the mobile radio module T22, which determines the bit error rate of the mobile radio signal received from the base station N31 of the mobile network N3. The error determination module T242 is produced as an integrated circuit or as a programmed software module and is situated, for example, on a chip common to the mobile radio module T22.

Particularly when the mobile radio module T22 and the broadcast receiver T21 are realized on a common chip, the quality modules T23 and T24 can be implemented in only one common combined quality module.

Moreover, the mobile terminal T2 includes an identification module T28, T202 with an identification data element stored in it. The identifier module T202 comprises a memory item, which is connected in a fixed way to the mobile terminal T2 and in which the identifier data element is stored or it is produced as chip card T28, for example a SIM-card (Subscriber Identification Module), which is connected with the mobile terminal T2 and is removable and on which the identifier data element is stored in memory item T281. The identifier data element is, for example, a user identification, for example an IMSI (International Mobile Subscriber Identity) for the identification of the user in the mobile network N3, a call number (e.g. a mobile Subscriber ISDN number, MSIDN), a precise apparatus number (e.g. an International Mobile Equipment Identifier, IMEI), that is write-protected and stored in the memory item T202, or it is another user-specific identifier data element or a combination of several of these data elements. The user identification can also include biometric identification features, for example digitalized fingerprints, iris models or retina models.

As schematically illustrated in FIG. 1, the mobile terminal T2 comprises processing means T27 for the subsequent treatment of the obtained, determined or measured data elements depending on the received broadcast signals and mobile radio communication signals. The processing means T27 are, for example, produced as a programmed software module that controls a processor of the mobile terminal T2. The processing means T27 can also be produced as hardware, particularly as integrated circuits.

TABLE 1

| Day-time | Date | Position | Broadcasting Station Identification | Broadcasting Field-strength value | Broadcasting bit error rate | Cell Identification | Mobile radio Communication Field-strength value | Mobile radio communication bit error rate |
| --- | --- | --- | --- | --- | --- | --- | --- | --- |

For a determined moment the processing means T27 store the broadcast signal quality detected in this moment, particularly the measured broadcast field strength value and/or the determined broadcast bit error rate, the detected mobile radio communication signal quality, particularly the measured mobile radio field strength value and/or the determined mobile radio bit error rate, the Base Station identification or cell identification, which is assigned to the base station N31, for which the mobile radio communication signal quality had been determined, as well as the determined geographical position. When the broadcast data obtained from the broadcast signals contains a broadcast station identification, the broadcast station identification of the radio transmitter B13 received at the respective moment can also be assigned to these data elements and stored in a memory as illustrated in Table 1.

Further data elements can also be stored through the processing means T27 with their corresponding determined hour and date, in particular program identifications taken from the received broadcast data, statement of content and provider identifications can be stored as further data elements.

The moment of data capture, in which the data elements represented in Table 1, and if necessary further data elements are also determined and stored in the mobile terminal T2, can be determined in different ways. The moment of data capture can, for example, be determined by the connection of the mobile terminal T2, it can be determined through the instruction input of the user by means of the operation items T203, or it can be determined through instruction data, which is received in the mobile terminal T2 via the air interface B12 from the broadcasting station B13 or via the mobile network N3 from the central processing unit P4. The capture of data elements can take place uniquely at a fixed moment of capture or it can take place more frequently, e.g. periodically from the fixed moment of capture onwards. If not, all data elements can be defined for a precise congruent moment, those data elements will be stored in the memory and assigned to each other, their values must be determined within a common defined time interval.

The processing means T27 introduce the data elements represented in Table 1 into the data accountings, and if necessary, also further data elements and then supply the provided data accounting to the mobile radio module T22 for transmission via the mobile network N3 to the memory M5 of the central processing unit P4. An identifier data element can also be introduced into the data accountings through the processing means T27 that is taken from the abovementioned identifier module T28, T202. The data accountings can, for example, be provided after every capture of data elements and can be transmitted to the central processing unit P4. If several data records, as illustrated in Table 1, which if necessary also comprise further data elements, are stored in a data table or in a data file in the mobile terminal T2 by means of the processing means T27, several of said records can be introduced into a common data accounting and be jointly transmitted to the central processing unit P4. The moment for the transmission of data accounting with several data records, for example, is determined by the processing means T27 due to a defined number of data records or a defined maximum time from data capture until transmission. The moment for the transmission of data accountings with several data records can also be determined by instruction data, which is received in the mobile terminal T2 via the air interface B12 from the broadcasting station B13 or via the mobile network N3 of the central processing unit P4. The transmission of the data accountings can also depend on the permission of the user of the mobile terminal T2, which is requested by the processing means T27 using the display T29 and is received via the control items T203.

If the central processing unit P4 is not directly connected to the mobile network N3, but for example is connected to the Internet 4, the mobile radio module T22 comprises an Internet module, for example a WAP-module (Wireless Application Protocol), for the purpose of providing access to the central processing unit P4 via the Internet, and if necessary, via an Internet-gateway.

The central processing unit P4 comprises at least once computer and is determined through a server-identification or a server-address, which is stored in the mobile terminal T2 and/or is received by the above mentioned instruction data in the mobile terminal T2. In the central processing unit P4 the data accountings transmitted from the mobile terminals T2 via the communication module P41 are received and are processed via the service module P42 that is produced as a programmed software module. The central processing unit P4 is connected to the memory M5. The service module P42 preferably disposes of a database management system (Database Management System, DBMS), by means of which the data records contained in the received data accounting, respectively the data elements, are stored and administered in the memory M5. Moreover, the service module P42 comprises functions for the statistical evaluation of the data stored in the memory M5, which is collected by a multitude of mobile terminals T2. For example, it can be determined which radio and/or television programs are watched and listened to, from which broadcast transmitters, from which population groups and the location, the time and the duration for which said programs are listened to or watched. In more detail it is possible to determine which broadcasting station and which radio or television programs are being used and how often a particular broadcasting station or radio or television program is connected or disconnected (during the connection or disconnection of the mobile terminal T2), and from which broadcast stations and from which radio or television programs are changes made and how often are these changes made to other broadcasting stations and radio or television programs (in the case of connected or disconnected mobile terminal T2), and to which broadcasting transmitter and radio or television programs are these changes directed from other broadcast transmitters and radio or television programs and how often can these changes be made. The number of short-time "visitor", that have connected to a determined broadcasting station and a determined radio or television program only for a predefined duration, for example five minutes can also be determined. It is possible to determine the signal quality of the received broadcasting and mobile radio signals and at which locations and at which moments. By considering the broadcast signal quality at the moment of switch off or change over it can also be deduced, if the listener or viewer had been provoked by the contents or poor reception quality to switch on or change over.

The central processing unit P4 can be connected via a communication connection B14 with the radio system B1. The communication connection B14 is, for example, an Internet-connection or another fixed network connection. A corresponding communication connection can also exist between the central processing unit P4 and the operating company of the mobile network N3, or rather the base stations N31. The collected data, evaluations and, if necessary, instruction data, that relates to the broadcasting station B13, can be transmitted from the central processing unit P4 by means of the communication module P41 to the data processing device B11 of the broadcast system B1. The collected data, evaluations and, if necessary, instruction data, that relates to the mobile network N3, respectively the base station(s) N31, can be transmitted from the central processing unit P4 by means of the communication module P41 to the operating company of the mobile network N3, respectively of the base stations N31. The transmission of the detected and evaluated broadcasting and mobile radio communication signal quality to the broadcast system B1 and to the operating company of the mobile radio network N3, respectively the base stations N31, allows the individual and/or combined tuning of the transmission outputs of the mobile network N3, respectively of the base station N31, and of the broadcast station B13.

The service module P42 can dispose moreover of functions for the purpose of crediting rewards to the respective users on the basis of identification data elements received for the transmission of the data accountings. The reward for example is carried out by means of transmission of assets to the mobile terminal T2, for example an assigned value for free acquisition of pay services, for example the acquisition of access controlled radio programs, television programs, data services or services in the mobile network N3.

COMMERCIAL APPLICABILITY

The present invention in particular allows the determination of the quality of the broadcast signals received from broadcast stations, as well as the quality of mobile radio communication signals received from base stations of mobile radio networks, by identifying location and comparing them. The present invention allows the detection, by local identification, of the signal quality of broadcast transmitters and mobile radio networks using the mobile terminals of the listeners, viewers and users without the use of special stationary or mobile measuring stations.

LIST OF REFERENCES

B1 Broadcast system
T2 Mobile terminal
N3 Mobile network
P4 Central processing unit
M5 Memory
B11 Data processing device
B12 Wireless interface between broadcasting station B13 and mobile terminal T2
B13 Broadcasting station
B14 Communication connection
T20 Position determination means
T21 Broadcast receiver
T22 Mobile radio module
T23, T24 Quality determination module
T25 Decoder
T26 Time determination means
T27 Processing means
T28 Identifier module
T29 Display
N31 Base station
N32 Wireless interface between base station N31 and mobile terminal T2
P41 Communication module
P42 Service module
T200 Electro-acoustic converter
T201 Receiving antenna
T202 Identifier module
T203 Control items
T231, T241 Field strength measuring module
T232, T242 Error determination module
T281 Memory item

The invention claimed is:

1. A hand-held portable mobile terminal comprising:
a broadcast receiver for receiving broadcast digital audio/video signals that are transmitted unidirectionally and wirelessly from a terrestrial broadcasting station connected to a central processing unit including a data memory,
a mobile radio transmitter receiver module configured for a bidirectional communication with the central processing unit, via a mobile network including a plurality of base stations, and configured to use the mobile network as a return channel to communicate with the terrestrial broadcast station via the central processing unit;
an identifier module associated with the mobile radio transmitter receiver module, the identifier module including a memory for storing an identification data element for identifying, in the mobile network, a user of the hand-held portable mobile terminal; and
a position determination module configured to determine a current geographical position of the hand-held portable mobile terminal, wherein
the modules of the hand-held portable mobile terminal are further configured to determine data elements related to characteristics of signals received from the terrestrial broadcasting station and from the base stations of the mobile network, the data elements determined based on instructions received from the terrestrial broadcast station, and
the modules also configured to provide data accountings to the data memory of the central processing unit via the mobile radio transmitter receiver module and the mobile network, the data accountings including the determined data elements and the determined current geographical position of the hand-held portable mobile terminal.

2. The hand-held portable mobile terminal according to claim 1, further comprising:
a quality determination module configured for determining the signal quality of the broadcast signals received from the terrestrial broadcasting station, the data related to the determined broadcast signal quality added as data elements into the data accountings.

3. The hand-held portable mobile terminal according to claim 1, further comprising:
a field strength measuring module configured for measuring the field strength of the broadcast signals received from the terrestrial broadcasting station, the measured broadcast field-strength values added as data elements into the data accountings.

4. The hand-held portable mobile terminal according to claim 1, further comprising:
a decoder module connected to the broadcast receiver configured for obtaining the broadcast data contained in the broadcast signals received from the terrestrial broadcasting station, the obtained broadcast data added as data elements into the data accountings.

5. The hand-held portable mobile terminal according to claim 4, wherein an identifier of the terrestrial broadcasting station is further added as data element into the data accountings.

6. The hand-held portable mobile terminal according to claim 5, further comprising:
an error determination module connected to the decoder module configured for determining the bit error rate of the broadcast signals received from the terrestrial broadcasting station, the determined bit error rate added as data elements into the data accountings.

7. The hand-held portable mobile terminal according to claim 4, further comprising:
an error determination module connected to the decoder configured for determining the bit error rate of the broadcast signals received from the terrestrial broadcasting station, the determined bit error rate added data elements into the data accountings.

8. The hand-held portable mobile terminal according to claim 1, further comprising:
a quality determination module configured for determining the signal quality of the mobile radio signals received from the base stations of the mobile network, the data related to the quality of the mobile radio signals added as data elements into the data accountings.

9. The hand-held portable mobile terminal according to claim 1, further comprising:
a field strength measuring module configured for measuring the field strength of the mobile radio signals received from the base stations of the mobile network, the measured mobile radio field-strength values added as data elements into the data accountings.

10. The hand-held portable mobile terminal according to claim 1, further comprising:
an error determination module configured for determining the bit error rate of the mobile radio signals received from the base stations of the mobile network, the measured mobile radio bit error rate added as data elements into the data accountings.

11. The hand-held portable mobile terminal according claim 1, wherein the identification data elements stored in the memory of the identifier module added into the data accountings.

12. The hand-held portable mobile terminal according to claim 1, wherein data elements determined by the modules at a same time schedule, assigned to each other are added to said data accountings.

13. A method for providing data in a system comprising several hand-held portable mobile terminals, each hand-held portable mobile terminal including
a receiver for receiving broadcasted digital audio/video signals transmitted unidirectionally and wirelessly from a terrestrial broadcasting station,
a mobile radio transmitter receiver module configured for a bidirectional communication via a mobile network including a plurality of base stations and configured to use the mobile network as a return channel to communicate with the terrestrial broadcast station via the central processing unit,
an identifier module including a memory for storing an identification data element identifying, in a mobile network, a user of the hand-held portable mobile terminal, and
a central processing unit having a data memory connected to the mobile network and to the terrestrial broadcasting station, the method comprising:
obtaining, by the hand-held portable mobile terminals, data elements related to characteristics of signals received from the terrestrial broadcasting station and from the mobile network base stations, the data elements obtained based on instructions received from the terrestrial broadcast station;
determining a current geographical position of the hand-held portable mobile terminal;
producing data accountings with the obtained data elements and the determined current geographical position, and
transmitting the data accountings, via the mobile radio transmitter receiver module and the mobile network, to the central processing unit for storing said data accountings into the data memory, said data accountings being made available to the terrestrial broadcasting station and to the mobile network for at least one of statistics and signals transmission improvement purposes.

14. The method according to claim 13, further including determining, by the hand-held portable mobile terminals, the signal quality of the broadcasted digital audio/video signals received from the terrestrial broadcasting station, and adding data related to the determined signal quality as data elements into the data accountings.

15. The method according to claim 13, further including measuring, by the hand-held portable mobile terminals, the field strength of the broadcasted digital audio/video signals received from the terrestrial broadcasting station, and adding the measured broadcast field-strength values as data elements into the data accountings.

16. The method according to claim 13, further including obtaining, by the hand-held portable mobile terminals, broadcast data contained in the broadcasted digital audio/video signals received from the terrestrial broadcasting station, and adding the obtained broadcast data as data elements into the data accountings.

17. The method according to claim 16, wherein an identification of the broadcast transmitter contained in the obtained broadcast data is added as data element into the data accountings.

18. The method according to claim 17, further including determining, by the hand-held portable mobile terminals, a bit error rate of the broadcast signal received from the terrestrial broadcasting station, and adding the determined broadcast bit error rate as data elements into said data accountings.

19. The method according to claim 16, further including determining, by the hand-held portable mobile terminals, a bit error rate of the broadcast signal received from the terrestrial broadcasting station, and adding the determined broadcast bit error rate as data element into said data accountings.

20. The method according to claim 13, further including determining, by the portable mobile terminals, a signal quality of the mobile radio signals received from the base stations of the mobile network, and adding the data related to the determined mobile radio communication signal quality as data elements into the data accountings.

21. The method according to claim 13, further including measuring, by the portable mobile terminals, a field strength of the mobile radio signals received from the base stations of the mobile network, and adding the measured mobile radio field-strength values as data elements into the data accountings.

22. The method according to claim 13, further including determining, by the portable mobile terminals, a bit error rate of the mobile radio signals received from the base stations of the mobile network, and add adding the measured mobile radio bit error rate as data elements into the data accountings.

23. The method according to claim 13, wherein the portable mobile terminals add the identification data stored in the memory of the identifier module into the data accountings.

24. The method according to clam 13, wherein the portable mobile terminals add data elements, obtained at a same time schedule, assigned each other into said data accountings.

* * * * *